(12) United States Patent
Sugimoto (10) Patent No.: US 8,182,126 B2
(45) Date of Patent: May 22, 2012

(54) AUTOMOTIVE HEADLAMP APPARATUS SYNTHESIZING LIGHT DISTRIBUTION PATTERNS OF RIGHT AND LEFT LAMP UNITS

(75) Inventor: Atsushi Sugimoto, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 167 days.

(21) Appl. No.: 12/538,786

(22) Filed: Aug. 10, 2009

(65) Prior Publication Data

US 2010/0033984 A1 Feb. 11, 2010

(30) Foreign Application Priority Data

Aug. 11, 2008 (JP) ................................. 2008-207428

(51) Int. Cl.
*F21V 17/02* (2006.01)
(52) U.S. Cl. ........................................ 362/512; 362/284
(58) Field of Classification Search .......... 362/507–512, 362/351, 277, 280–284
See application file for complete search history.

(56) References Cited

U.S. PATENT DOCUMENTS

| | | | | | |
|---|---|---|---|---|---|
| 1,834,542 | A | * | 12/1931 | Karlebo | 362/281 |
| 6,179,455 | B1 | * | 1/2001 | Taniuchi | 362/507 |
| 2001/0015896 | A1 | * | 8/2001 | Tsukamoto | 362/509 |
| 2002/0089853 | A1 | * | 7/2002 | Taniuchi et al. | 362/297 |
| 2003/0090906 | A1 | * | 5/2003 | Hayakawa | 362/517 |
| 2003/0165066 | A1 | * | 9/2003 | Watanabe et al. | 362/523 |
| 2004/0228139 | A1 | * | 11/2004 | Taniuchi | 362/539 |
| 2005/0180154 | A1 | * | 8/2005 | Albou et al. | 362/514 |
| 2005/0276062 | A1 | * | 12/2005 | Pauty et al. | 362/539 |
| 2006/0023465 | A1 | * | 2/2006 | Ohshio et al. | 362/514 |
| 2007/0147061 | A1 | | 6/2007 | Lee et al. | |

FOREIGN PATENT DOCUMENTS

| | | |
|---|---|---|
| DE | 2006 043 281 A1 | 3/2008 |
| DE | 102006043281 A1 | 3/2008 |
| DE | 2007 045 150 A1 | 4/2008 |
| EP | 0 294 589 A2 | 12/1988 |
| EP | 2 039 567 A1 | 3/2009 |
| JP | 2007-179969 | 12/2007 |

OTHER PUBLICATIONS

European Search Report.
Office action for European Patent Application No. 09 167 465.5-2423, dated Aug. 20, 2010.
EPO, Office Action in European Patent Application No. 09 167 465.5-2423 dated Dec. 30, 2011.

* cited by examiner

*Primary Examiner* — Julie Shallenberger
(74) *Attorney, Agent, or Firm* — Fulwider Patton LLP (57) ABSTRACT

An automotive headlamp apparatus includes a left lamp unit, a right lamp unit and a headlamp apparatus control unit. Each of the left lamp unit and the right lamp unit includes a bulb, a movable shade, a shade moving mechanism and a fixed shade. Each movable shade can advance or recede with respect to the light axis of the bulb, and forms an individual light distribution pattern for a low-beam by shielding part of a light at an advanced position while allowing formation of a partial shape of a light distribution pattern for a high-beam at a receded position. The fixed shade forms the partial shape of the light distribution pattern for a high-beam when the movable shade is located at the receded position. A pattern control unit determines each shape of the individual light distribution patterns by controlling each of the shade moving mechanisms in the left lamp unit and the right lamp unit, and also determines a shape of a synthesized light distribution pattern by superimposing each of the individual light distribution patterns one on another.

6 Claims, 6 Drawing Sheets

| MODE | MOVA-BLE SHADE | EACH INDIVIDUAL LIGHT DISTRIBUTION PATTERN | SYNTHESIZED LIGHT DISTRIBUTION PATTERN |
|---|---|---|---|
| 1 NORMAL LO BEAM<br><br>MOVABLE SHADES 48L, 48R ARE AT ADVANCED POSITIONS | 48L |  LoL |  LoC |
| | 48R |  LoR | |
| 2 PRECEDING VEHICLE IS ABSENT ONCOMING VEHICLE IS PRESENT<br><br>MOVABLE SHADE 48L IS ONLY AT RECEDED POSITION | 48L |  HiL |  HiCL |
| | 48R |  LoR | |
| 3 PRECEDING VEHICLE IS PRESENT ONCOMING VEHICLE IS ABSENT<br><br>MOVABLE SHADE 48R IS ONLY AT RECEDED POSITION | 48L |  LoL |  HiCR |
| | 48R |  HiR | |
| 4 HI BEAM<br><br>MOVABLE SHADES 48L, 48R ARE AT RECEDED POSITIONS | 48L |  HiL |  HiC |
| | 48R |  HiR | |

AUTOMOTIVE HEADLAMP APPARATUS SYNTHESIZING LIGHT DISTRIBUTION PATTERNS OF RIGHT AND LEFT LAMP UNITS

BACKGROUND OF THE INVENTION

1. Field of the Invention

The present invention relates to an automotive headlamp apparatus, in particular, to a structure of an automotive headlamp apparatus that forms multiple types of light distribution patterns using shades.

2. Description of the Related Art

An automotive headlamp apparatus is designed to emit a low-beam or a high-beam by emitting a light from a light source in the automotive front direction through a projection lens. Light distribution patterns of emitted beams are different from each other between the low-beam and the high-beam. There are known so-called four-lamp type and fixed light distribution type headlamps that perform switching between the low-beam and the high-beam by switching on/off the light sources for a low-beam and a high-beam. Also, there are known so-called two-lamp type and variable light distribution type headlamps that form a light distribution pattern for a low-beam by shielding part of the beam emitted from a light source, while form that for a high-beam when not shielding any part of the beam.

Recently, with progress toward high-performance and high-functionality in vehicles, headlamps apparatus thereof are required so as to be capable of forming light distribution patterns to deal with various situations. In particular, the high-beam has a possibility of providing a dazzle entailing a sense of discomfort, so-called a "glare", to an oncoming vehicle, pedestrian, preceding vehicle or the like; and therefore the high-beam is apt to be withheld from use when an oncoming vehicle, pedestrian, preceding vehicle or the like is present, resulting in low usage frequency of the high-beam. On the other hand, the high-beam has an effect of improving forward visibility of a driver, and hence the high-beam is required so as to form a light distribution pattern without providing a glare. To meet such a demand, for example, Japanese Patent Application Publication No. 2007-179969 discloses a structure in which a light distribution pattern of the high-beam can be changed. In the structure, a plurality of light sources are installed in a headlamp apparatus for a high-beam such that a light distribution pattern can be changed in shape by controlling switching on/off of the light sources.

The automotive headlamp apparatus for a high-beam disclosed in the above Japanese Patent Application Publication No. 2007-179969 is capable of optimally setting a high-beam emitting region in accordance with presence or absence of a pedestrian, preceding vehicle or oncoming vehicle, and is effective as a structure for forming an optimal light distribution pattern for a high-beam. However, there is room for improvement in terms of cost and control system, and therefore a technique is required to be developed in which the high-beam emitting region is optimized with a simpler structure and a simpler control system, in the same way as the structure disclosed in the above Japanese Patent Application Publication No. 2007-179969.

SUMMARY OF THE INVENTION

Accordingly, the present invention has been made to solve the aforementioned problem, and a purpose of the invention is to propose an automotive headlamp apparatus in which the high-beam emitting region can be set optimally without a great change in the structure of the headlamp apparatus and an increase in the number of light sources, and also without a complicated emission control operation.

To solve the aforementioned problem, an embodiment of the present invention relates to an automotive headlamp apparatus including: a left lamp unit and a right lamp unit that are installed apart from each other, located right and left in the automotive width direction, each of which is capable of forming an individual light distribution pattern; and a pattern control unit that controls the left lamp unit and the right lamp unit for controlling each shape of the individual light distribution patterns thereof. Each of the left lamp unit and the right lamp unit includes: a light source that is capable of emitting a light in the automotive front direction through a projection lens; a movable shade that can advance or recede with respect to the light axis of the light source, and that forms a light distribution pattern for a low-beam by shielding part of the light from the light source at an advanced position while allowing formation of a partial shape of a light distribution pattern for a high-beam at a receded position; a shade moving mechanism that moves the movable shade to an advanced or a receded position; and a fixed shade that forms the partial shape of the light distribution pattern for a high-beam when the movable shade is located at the receded position. The pattern control unit determines each shape of the individual light distribution patterns by controlling each of the shade moving mechanisms in the left lamp unit and the right lamp unit, and also determines a shape of a synthesized light distribution pattern by superimposing each of the individual light distribution patterns one on another.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention. Hereinafter, the preferred embodiments of the present invention will be described based on the accompanying drawings.

An automotive headlamp apparatus according to the present embodiment includes: a left lamp unit and a right lamp unit that are installed apart from each other, located right and left in the automotive width direction, each of which is capable of forming an individual light distribution pattern; and a pattern control unit that controls the left lamp unit and the right lamp unit for controlling each shape of the individual light distribution patterns thereof. Each of the left lamp unit and the right lamp unit includes a light source that is capable of emitting a light in the automotive front direction through a projection lens, a movable shade, a shade moving mechanism and a fixed shade. The movable shade can advance or recede with respect to the light axis of the light source, and forms an individual light distribution pattern for a low-beam by shielding part of the light from the light source at an advanced position while allowing formation of a partial shape of a light distribution pattern for a high-beam at a receded position. The fixed shade forms the partial shape of the light distribution pattern for a high-beam when the movable shade is located at the receded position. The pattern control unit determines each shape of the individual light distribution patterns by controlling each of the shade moving mechanisms in the left lamp unit and the right lamp unit, and also determines a shape of a synthesized light distribution pattern by superimposing each of the individual light distribution patterns one on another. For example, each of the left lamp unit and the right lamp unit is solely capable of forming a light distribution pattern for a low-beam by moving the movable shade to an advanced position. That is, even if either one of the lamp units cannot be emitted, a low-beam emitting function as the automotive headlamp apparatus can be performed. Further, a light distribution pattern for a high-beam can be formed by superimposing each of the individual light distribution patterns one on another for synthesis, in a state where the movable shades in the left lamp unit and the right lamp unit are moved to receded positions such that the both lamp units are emitted. Furthermore, by moving the movable shade in the left lamp unit to a receded position and that in the right lamp unit to the advanced position, and then by superimposing the individual light distribution patterns one on another for synthesis, a left-high light distribution pattern can be formed in which the left emitting region in the front direction of a vehicle is in a high-beam emitting state while the right emitting region therein is in a low-beam emitting state. Likewise, by moving the movable shade in the right lamp unit to the receded position and that in the left lamp unit to the advanced position, and then by superimposing the individual light distribution patterns one on another for synthesis, a right-high light distribution pattern can be formed in which the right emitting region in the front direction of the vehicle is in a high-beam emitting state while the left emitting region therein is in a low-beam emitting state. That is, by superimposing the individual light distribution patterns formed by the left lamp unit and the right lamp unit one on another for synthesis, not only a light distribution pattern for a low-beam but also multiple types of light distribution patterns for a high-beam can be attained by easy control of moving the movable shades to the advanced positions or the receded positions.

Figure 1:
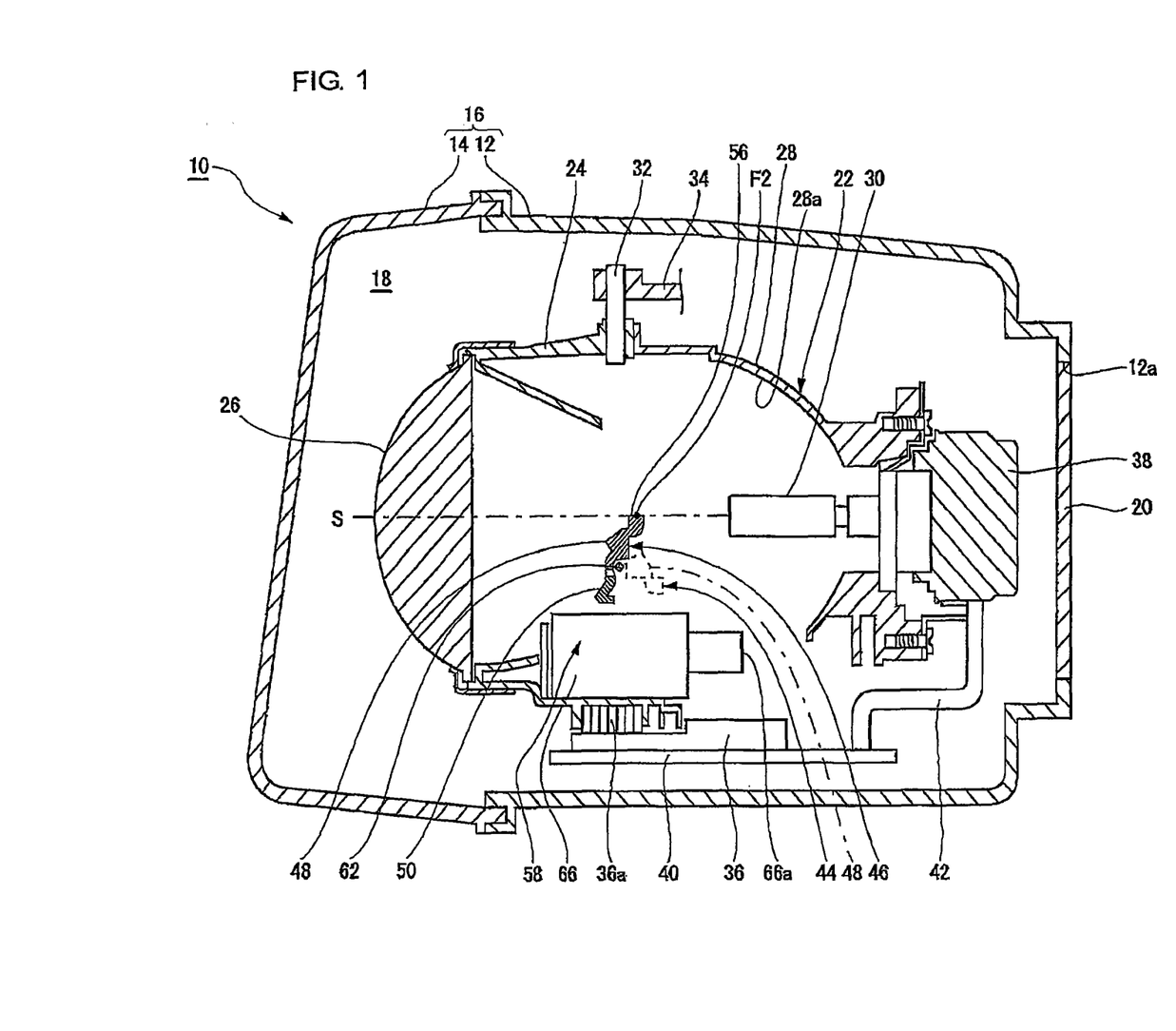
FIG. 1 is a composition diagram illustrating a schematic composition of an automotive headlamp apparatus including a lamp unit having a movable shade according to the present embodiment.
Figure 2:
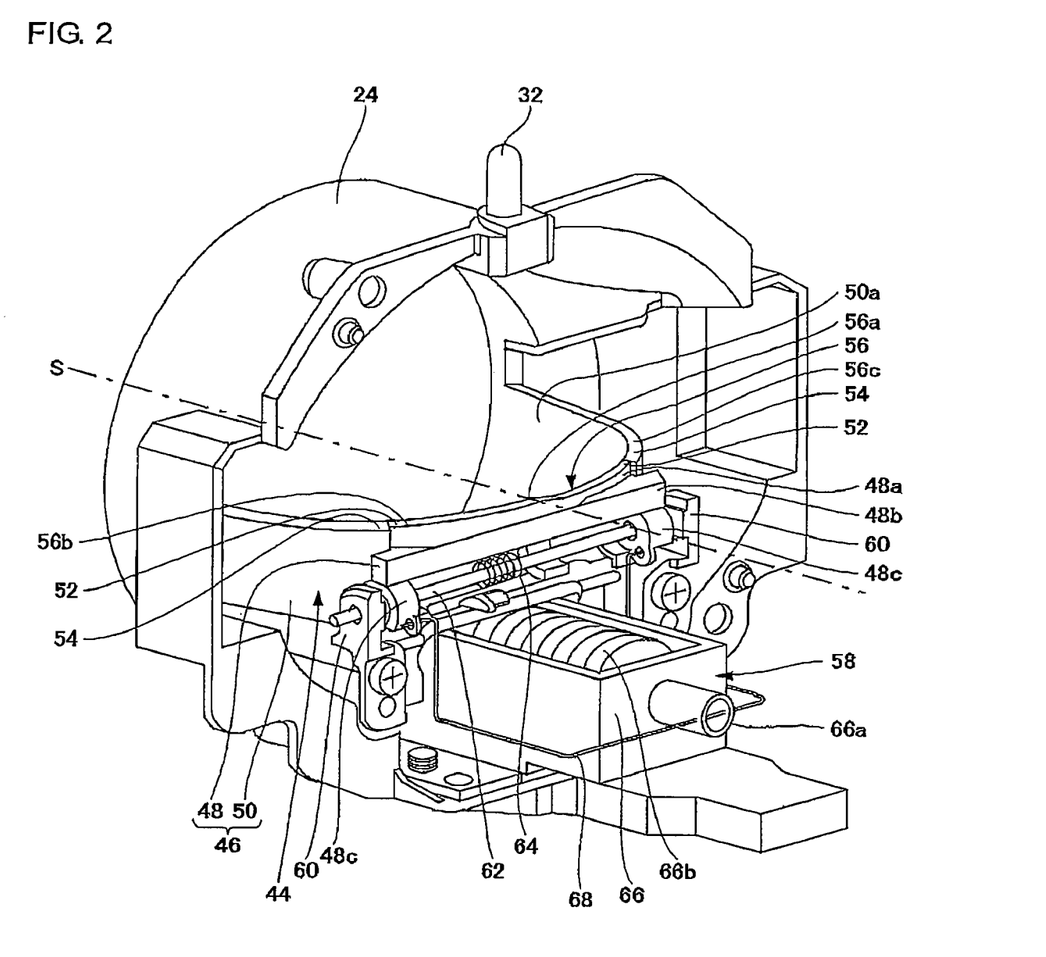
FIG. 2 is a perspective diagram illustrating an interior structure of the lamp unit in the automotive headlamp apparatus in FIG. 1.

FIG. 1 is a composition diagram illustrating a schematic composition of the automotive headlamp apparatus 10 including the lamp unit according to the present embodiment. FIG. 2 is a perspective diagram illustrating an interior structure of the lamp unit in the automotive headlamp apparatus 10. In the automotive headlamp apparatus 10, the left lamp unit and the right lamp unit installed apart from each other, located right and left in the automotive width direction, have the same basic stricture with each other, and hence the left lamp unit and its associated members will be described in FIG. 1, omitting descriptions with respect to the right lamp unit.

The automotive headlamp apparatus 10 including the left lamp unit is arranged in the left end portion of the automotive front end portion, while the automotive headlamp apparatus 10 including the right lamp unit is arrange in the right end portion thereof, apart from the left lamp unit.

As illustrated in FIG. 1, the automotive headlamp apparatus 10 comprises: a lamp body 12 having a concave portion, the front of which is opened; and a transparent cover 14 covering the opened plane of the lamp body 12. A lamp unit housing 16 is structured by the lamp body 12 and the transparent cover 14, defining the interior space of the lamp unit housing 16 as a lamp chamber 18.

A mounting hole 12a penetrated through forwards and backwards is formed in the back end portion of the lamp body 12. A back cover 20 is fixed to the mounting hole 12a.

A lamp unit 22 is arranged in the lamp chamber 18. The lamp unit 22 includes: a lens holder 24; a projection lens 26 fixed to the front end portion of the lens holder 24; a reflector 28 fixed to the back surface of the lens holder 24; and a bulb 30 as a light source fixed to the back end portion of the reflector 28. It is noted that, in the present embodiment, the light from the light source includes a light from the bulb 30 itself, as well as a reflected light that is emitted from the bulb 30 and reflected by the reflector. For the bulb 30, for example, an incandescent bulb, a halogen lamp, a discharge bulb, an LED or the like is applicable. The present embodiment illustrates the bulb 30 structured by a halogen lamp as an example.

The lamp unit 22 is supported by the lamp body 12 through a not-illustrated light axis adjustment mechanism. The lamp unit 22 can be moved in the upward-downward or right-left direction with respect to the lamp body 12 by operating the axis light adjustment mechanism, allowing the light axis of the light emitted from the light source such as the bulb 30, etc, to be adjusted. That is, for example, aiming adjustment or leveling adjustment can be executed.

The lens holder 24 is formed into roughly a cylindrical shape penetrated through the forward-backward direction. A rotation axis 32 extending upwards-downwards is fixed to the top end portion of the lens holder 24, the rotation axis 32 being rotatably supported by a support member 34 located over the lens holder 24 in the lamp chamber 18. Accordingly, the lamp unit 22 having the lens holder 24 is designed to be rotatable in the right-left direction with respect to the lamp unit housing 16, with the rotation axis 32 being a fulcrum point. Such rotational movement of the lamp unit 22 in the right-left direction with respect to the lamp unit housing 16 can be coupled with a driver's steering operation, allowing a swivel function to be realized. For example, an actuator 36 composed of a motor, etc., is arranged under the lens holder 24 in the lamp chamber 18. The actuator 36 has a connection unit 36a extending upwards in the front end portion thereof. The connection unit 36a is connected to the bottom end portion of the lens holder 24. The connection unit 36a is rotated by a driving force of the actuator 36, which allows the lamp unit 22 to be rotated in the right-left direction in accordance with the rotational direction of the actuator 36, with the rotation axis 32 being a fulcrum point. That is, the swivel function in the automotive right-left direction can be realized.

The projection lens 26 is a plano-convex aspheric lens having its front surface of a convex surface and its back surface of a planar surface. Accordingly, the projection lens 26 has a function of forwards projecting an image on the backside focal plane including the backside focal point F2 as an upside-down and right-left inverted image.

The reflector 28 is formed such that the inner surface thereof is a reflecting surface 28a, which is formed into, for example, roughly an elliptic sphere excluding the front portion thereof. The reflecting surface 28a is formed such that the first focal point thereof is exactly located at the light-emitting portion of the bulb 30, and the second focal point thereof is exactly located at the backside focal point F2 of the projection lens 26. The bulb 30 is connected to and supported by a bulb socket 38 arranged in the backside thereof.

In the bottom end portion of the lamp chamber 18, is arranged a headlamp apparatus control unit 40 by which emission of the lamp unit 22 is controlled. A feeding cord 42 extending from the headlamp apparatus control unit 40 is connected to the bulb socket 38. Accordingly, a driving voltage is applied to the bulb 30 through the feeding cord 42 by controlling the headlamp apparatus control unit 40, allowing a light to be emitted. The light emitted from the bulb 30 travels forwards or is reflected on the reflecting surface 28a of the reflector 28, which is condensed on the backside focal plane including the backside focal point F2 of the projection lens 26 and then projected forwards as an illuminating light by the projection lens 26. Also, the headlamp apparatus control unit 40 controls the actuator 36 such that the swivel function of rotating the lamp unit 22 in the right-left direction is controlled.

The automotive headlamp apparatus 10 according to the present embodiment synthesizes the single synthesized light distribution pattern as the automotive headlamp apparatus 10 from the light distribution pattern formed by the left lamp unit and that formed by the right lamp unit. Accordingly, the headlamp apparatus control unit 40 in either one of the left lamp unit and the right lamp unit includes the pattern control unit that determines shapes of light distribution patterns formed by the left lamp unit and the right lamp unit, and then superimposes the both patterns one on another for control. The pattern control unit will be described below.

Figure 3:
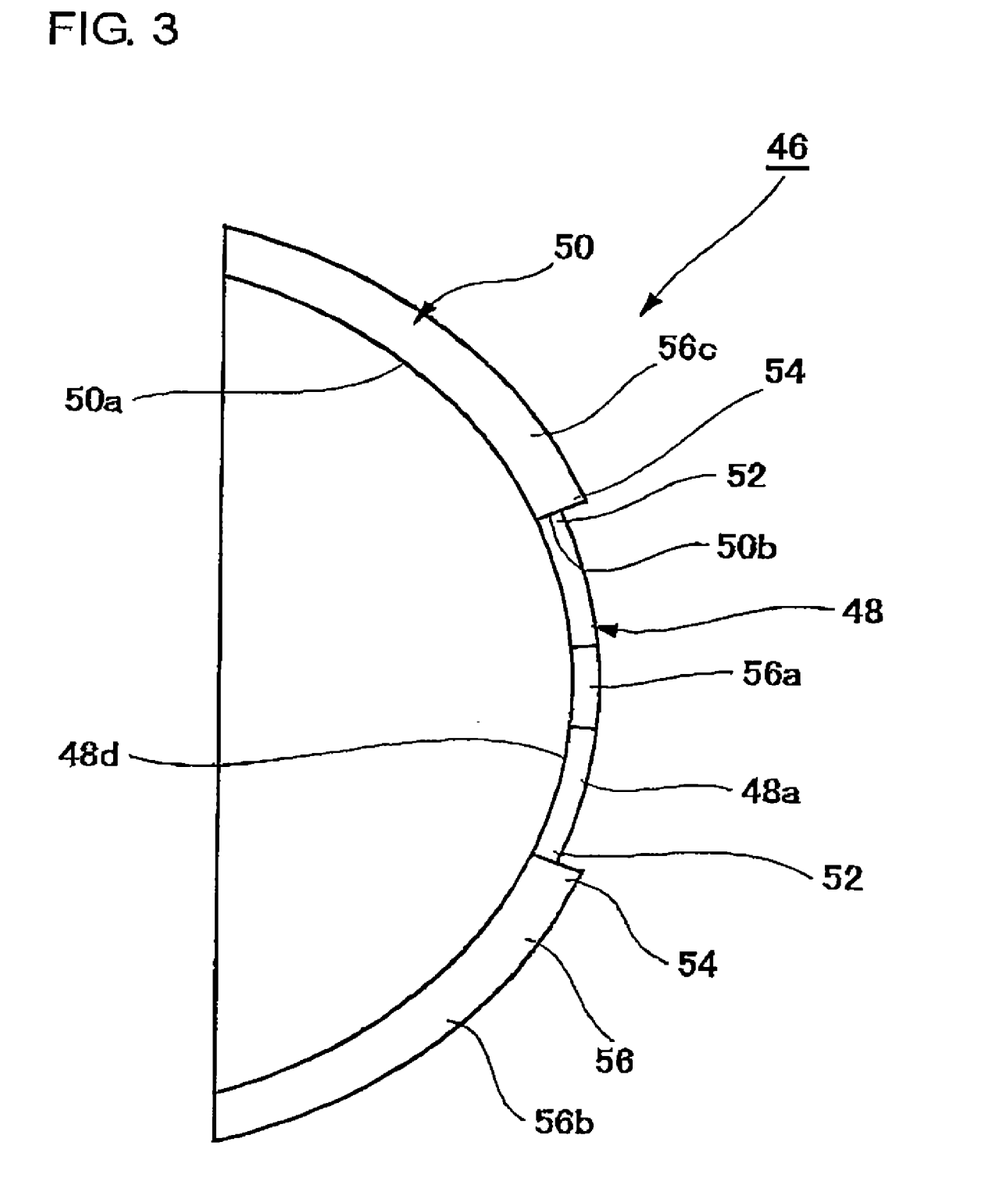
FIG. 3 is a top diagram illustrating the movable shade and a fixed shade in the lamp unit according to the present embodiment, as seen from top.

Inside the lamp unit 22, is arranged a light distribution pattern switching mechanism 44 between the projection lens 26 and the bulb 30. As illustrated in FIGS. 1 and 2, the light distribution pattern switching mechanism 44 has a shade 46. The shade 46 is composed of a movable shade 48 and a fixed shade 50, the movable shade 48 being designed to be rotatable relative to the fixed shade 50. The movable shade 48 can advance or recede with respect to the light axis of the light from the light source such as the bulb 30, etc., and forms the individual light distribution pattern for a low-beam by shielding part of the light from the bulb 30 or the reflected light reflected by the reflector 28 at the advanced position. Also, the movable shade 48 allows formation of a partial shape of the light distribution pattern for a high-beam at the receded position. On the other hand, the fixed shade 50 forms the partial shape of the light distribution pattern for a high-beam when the movable shade 48 is located at the receded position. FIG. 3 is a top diagram illustrating the movable shade 48 and the fixed shade 50, as seen from top. Descriptions with respect to detailed shapes of the movable shade 48 and the fixed shade 50 will be made below; however, the movable shades 48 having the same shape with each other are used in the left lamp unit and the right lamp unit. On the other hand, the fixed shades 50 having different shapes from each other are used in the left lamp unit and the right lamp unit.

The fixed shade 50 is formed into roughly a bowl shape in which the shade is opened upwards and forwards and the inner surface 50a thereof is formed into a curved surface. As illustrated in FIG. 3, a severed portion 50b opened upwards is formed in the top end portion of the fixed shade 50 excluding the right and left end portions thereof. As illustrated in FIGS. 2 and 3, the movable shade 48 has: an opening/closing portion 48a formed into a gentle circular arc shape curved convexly backwards; a connection portion 48b that is continued to the bottom edge of the opening/closing portion 48a and that extends in the right-left direction; and a pair of supported projected portions 48c, each of which projects downwards from each of both end portions of the connection portion 48b. The movable shade 48 is rotated such that the opening/closing portion 48a opens/closes the severed portion 50b of the fixed shade 50, that is, rotated between the advanced position where the severed portion 50b is closed (the position of the movable shade 48 illustrated by the continuous line in FIG. 1) and the receded position where the severed portion 50b is opened (the position of the movable shade 48 illustrated by the imaginary line in FIG. 1). The advanced position is one where a beam is emitted toward a close range by the fixed shade 50 and the movable shade 48, that is, the so-called light distribution pattern for a low-beam is formed. In the case of the present embodiment, the receded position is located backwards, i.e., on the bulb 30 side of the advanced position, and is one where a beam is emitted towards a long range by the fixed shade 50, that is, part of the so-called light distribution pattern for a high-beam is formed. Accordingly, switching between the low-beam and the high-beam is performed by rotating the movable shade 48 between the advanced position and the receded position.

As illustrated in FIG. 3, in the movable shade 48, the right and left end portions of the opening/closing portion 48a are provided as contact portions 52. The contact portion 52 is to be in contact with a contacted portion 54 of the fixed shade 50 in a state where the movable shade 48 is moved to the advanced position. In this case, the inner surface 48d of the movable shade 48 and that 50a of the fixed shade 50 are designed to be located on the same curved surface. The curved surface formed by the inner surfaces 48d and 50a is curved in accordance with a curved shape of the backside focal plane of the projection lens 26. By matching the curved shapes with each other in this way, distances between the projection lens 26 and the movable shade 48 and the fixed shade 50 can be made substantially uniform. As a result, shape distortion of projection images in the automotive-width-directional edge portions of the movable shade 48 and the fixed shade 50 can be suppressed from occurring. Accordingly, when superimposing the light distribution patterns formed by the left lamp unit and the right lamp unit one on another for synthesis, deviation of the two patterns can be prevented, allowing a clear synthesized light distribution pattern to be formed.

The top end surface of the shade 46 is provided with an edge line portion 56 for forming a cut-off line in the light distribution pattern for a low-beam. As illustrated in FIGS. 2 and 3, the edge line portion 56 is designed to have: an inclined portion 56a in which the central portion in the right-left direction, i.e., the roughly central portion in the right-left direction of the movable shade 48 is inclined; and a first horizontal edge line portion 56b and a second horizontal edge line portion 56c in which the right and left portions of the inclined portion 56a extend in the horizontal direction, respectively. The first horizontal edge line portion 56b is located at a higher position than the second horizontal edge line portion 56c, the first horizontal edge line portion 56b being designed to form a horizontal cut line on the opposite lane side in left-hand traffic, while the second horizontal edge line portion 56c being designed to form a horizontal cut line on the own lane side therein. As stated above, the edge line portion 56, a border for shielding a light when the movable shade 48 is at the advanced position, is arranged along the backside focal plane of the projection lens 26. With such an arrangement, a clear cut-off line can be formed. As a result, when superimposing the individual light distribution pattern for a low-beam formed by the left lamp unit and that formed by the right lamp unit one on another, the synthesized light distribution pattern for a low-beam in which clearness of the cut-off line is maintained, can be formed.

As illustrated in FIG. 2, in a state where the movable shade 48 is at the advanced position, the inclined portion 56a of the edge line portion 56 is designed to approximately cut across the light axis S of the light emitted from the bulb 30. The movable shade 48 can advance and recede between the advanced position and the receded position by the shade moving mechanism 58. The shade moving mechanism 58 is arranged on the top surface in the bottom of the lens holder 24. As illustrated in FIG. 2, the shade moving mechanism 58 includes: a pair of supporting projected portions 60; a fulcrum shaft 62 that is long in the right-left direction; a bias spring 64 that is a torsion coil spring; a solenoid block 66; and a wire-shaped connection link 68. Each of the supporting projected portions 60 is arranged outside in the right-left direction of the supported projected portion 48c of the movable shade 48, and is fixed to the lens holder 24. The fulcrum shaft 62 penetrates through the supporting projected portions 60 and the supported projected portions 48c of the movable shade 48. The movable shade 48 is designed to be rotatable relative to the supporting projected portions 60, with the fulcrum shaft 62 being a fulcrum point. The bias spring 64 is supported by the fulcrum shaft 62 and has a function of biasing the movable shade 48 toward the advanced position.

The solenoid block 66 is provided with a driving tube 66a that projects backwards and is movable forwards-backwards. The driving tube 66a and the supported projected portions 48c of the movable shade 48 are connected together by the connection link 68. In the shade moving mechanism 58, when the driving tube 66a is moved forwards by driving the solenoid 66b of the solenoid block 66, the movable shade 48 is rotated from the advanced position toward the receded position, with the fulcrum shaft 62 being a fulcrum point. When the driving tube 66a is moved backwards by driving the solenoid 66b of the solenoid block 66, the movable shade 48 is rotated from the receded position toward the advanced position, with the fulcrum shaft 62 being a fulcrum point.

The bias spring 64 in the shade moving mechanism 58 preferentially moves the movable shade 48 to the advanced position when the shade moving mechanism 58 is in an uncontrolled state. For example, if any abnormality occurs in a moving system including the shade moving mechanism 58 when the movable shade 48 is located at the receded position, the movable shade 48 is preferentially moved to the advanced position. Because this operation is performed when the shade moving mechanism 58 is in an uncontrolled state, the operation can be realized only by cutting the driving force for the solenoid 66b of the shade moving mechanism 58. Accordingly, the bias spring 64 serves as an automatic return mechanism for moving the movable shade 48 to the advanced position, even if the shade moving mechanism 58 is in an uncontrollable state. As a result, if the movable shade 48 undergoes any abnormality in its control, the individual light distribution pattern for a low-beam can be preferentially formed. That is, a fail-safe function for an abnormality in control is realized, and therefore a light distribution state having less possibility of providing a glare to an oncoming vehicle or pedestrian can be swiftly realized. It is preferable that fail-control is executed in which, if either one of the left lamp unit and the right lamp unit undergoes a failure, the shade moving mechanism in the normal lamp unit preferentially also moves the movable shade 48 to the advanced position.

As described above, when a light is emitted from the bulb 30 in a state where the movable shade 48 is moved to the advanced position, the individual light distribution pattern for a low-beam is formed by shielding part of the light with the shade 46 composed of the movable shade 48 and the fixed shade 50. Further, when a light is emitted from the bulb 30 in a state where the movable shade 48 is moved to the receded position, the movable shade 48 allows the light to pass through, forming the partial shape of the light distribution pattern for a high-beam only by the fixed shade 50. Furthermore, by superimposing the partial light distribution pattern formed by the left lamp unit and that formed by the right lamp unit one on another, the single synthesized light distribution pattern for a low-beam or the high-beam can be formed as the automotive headlamp apparatus 10.

Figure 4A:
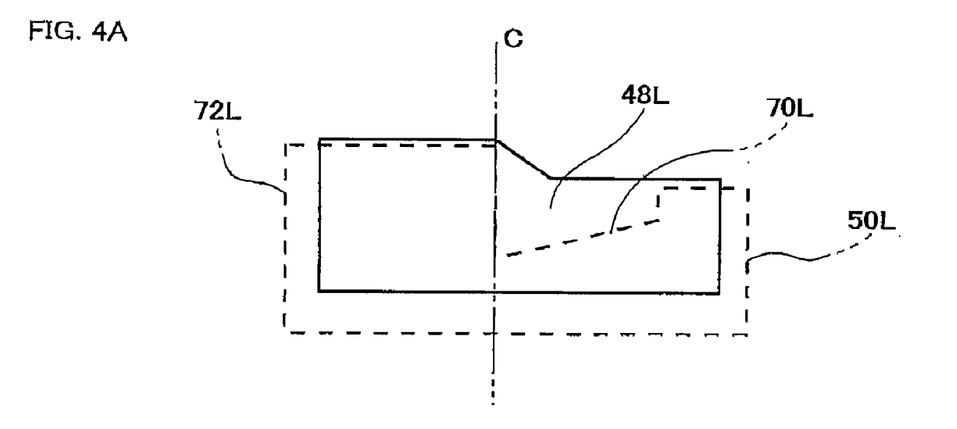
FIGS. 4A and 4B are diagrams illustrating shapes of the movable shade and the fixed shade in the lamp unit according to the present embodiment, FIG. 4A illustrating the movable shade and the fixed shade used in the left lamp unit, while FIG. 4B illustrating the movable shade and the fixed shade used in the right lamp unit.
Figure 4B:
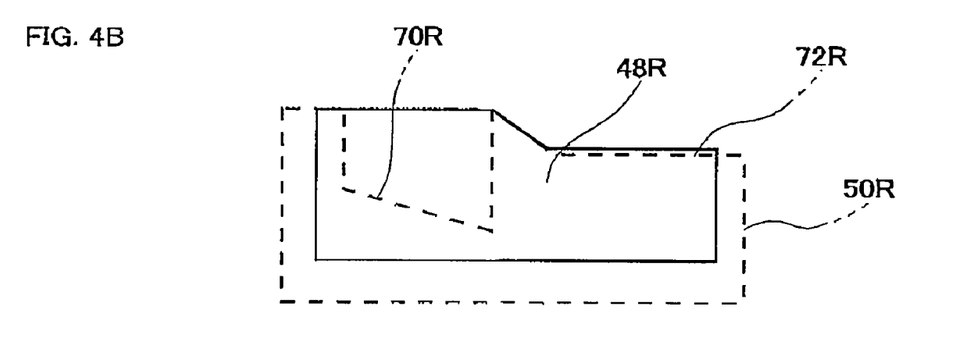

FIG. 4A illustrates the movable shade 48L and the fixed shade 50L used in the left lamp unit, while FIG. 4B illustrates the movable shade 48R and the fixed shade 50R used in the right lamp unit. As described above, the movable shade 48L used in the left lamp unit and that 48R used in the right lamp unit have the same shape with each other, and the synthesized light distribution pattern for a low-beam formed when the movable shades 48L and 48R both moves to the advanced positions, has the same shape as that of each of the partial light distribution patterns.

On the other hand, the fixed shade 50L in the left lamp unit and that 50R in the right lamp unit have different shapes from each other. Specifically, as illustrated in FIG. 4A, the fixed shade 50L in the left lamp unit has a severed portion 70L, the right side portion of the center line C of which is largely severed in order to emit a light toward the left side region of the light axis in the light distribution pattern for a high-beam to be synthesized. Further, the fixed shade 50L has a shielding portion 72L for shielding a light on the left side of the center line C. On the other hand, as illustrated in FIG. 4B, the fixed shade 50R in the right lamp unit has a severed portion 70R, the left side portion of the center line C of which is largely severed in order to emit a light toward the right side region of the light axis in the light distribution pattern for a high-beam to be synthesized. Further, the fixed shade 50R has a shielding portion 72R for shielding a light on the right side of the center line C. As stated above, the fixed shade 50L in the left lamp unit forms the left side region of the light axis in the light distribution pattern for a high-beam, while the fixed shade 50R in the right lamp unit forms the right side region of the light axis therein. That is, the left lamp unit and the right lamp unit respectively form the individual light distribution patterns in different regions from each other, and hence formation of a single-high light distribution pattern can be readily controlled.

Figure 5:
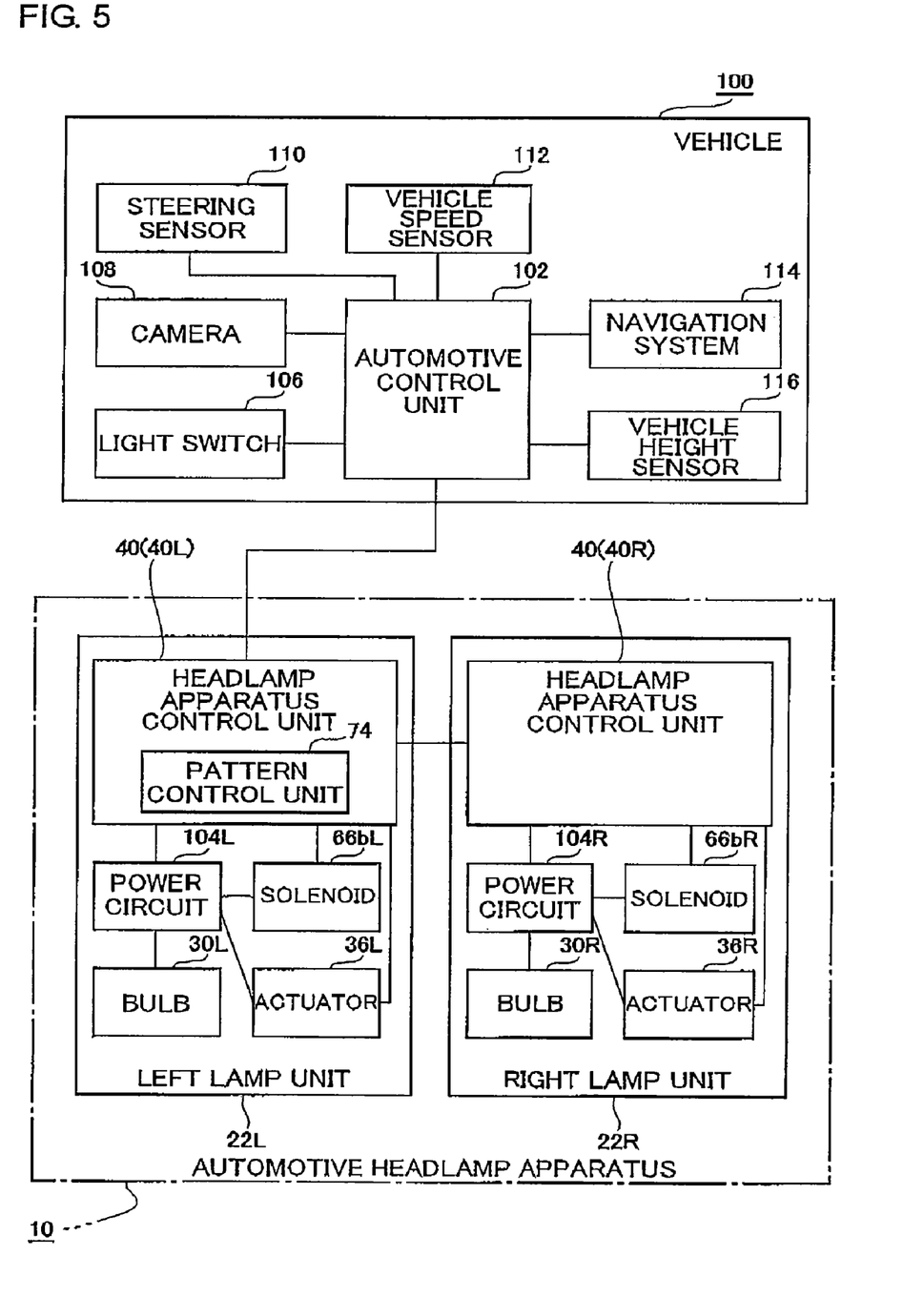
FIG. 5 is a functional block diagram illustrating compositions of a headlamp apparatus control unit in the automotive headlamp apparatus according to the present embodiment and an automotive control unit on a vehicle side.

FIG. 5 is a functional block diagram illustrating compositions of the headlamp apparatus control unit 40 (40L, 40R) in the automotive headlamp apparatus 10 structured as stated above, and an automotive control unit 102 on a vehicle 100 side. The automotive headlamp apparatus 10 includes the left lamp unit 22L and the right lamp unit 22R. In the present embodiment, if it is necessary to particularly distinguish constituents from each other, the constituents respectively installed in the left lamp unit 22L and the right lamp unit 22R and having functions equivalent to each other, symbols of the constituents on the left lamp unit 22L side are added with "L", while that on the right lamp unit 22R side with "R".

The left lamp unit 22L is controlled by the headlamp apparatus control unit 40L, while the right lamp unit 22R by the headlamp apparatus control unit 40R. As stated above, the automotive headlamp apparatus 10 according to the present embodiment superimposes the partial light distribution pattern formed by the left lamp unit 22L and that formed by the right lamp unit 22R one on another for synthesis. Accordingly, for example, the headlamp apparatus control unit 40L includes the pattern control unit 74 as an integrated control unit for the left lamp unit 22L and the right lamp unit 22R. The pattern control unit 74 manages control states of the headlamp apparatus control units 40L and 40R such that the individual light distribution patterns in the left lamp unit 22L and the right lamp unit 22R are respectively formed according to an command from the automotive control unit 102. The pattern control unit 74 may be included in the headlamp apparatus control unit 40R.

The headlamp apparatus control unit 40L, control state of which is determined by the pattern control unit 74, controls the solenoid 66bL included in the shade moving mechanism in the left lamp unit 22L to determine a shape of the individual light distribution pattern. Further, the headlamp apparatus control unit 40L controls a power circuit 104L in the left lamp unit 22L to control switching on/off of the bulb 30L or to control the actuator 36L for swivel control. Likewise, the headlamp apparatus control unit 40R, control state of which is determined by the pattern control unit 74, controls the solenoid 66bR included in the shade moving mechanism in the right lamp unit 22R to determine a shape of the individual light distribution pattern. Further, the headlamp apparatus control unit 40R controls a power circuit 104R in the right lamp unit 22R to control switching on/off of the bulb 30R or to control the actuator 36R for swivel control.

In the present embodiment, the synthesized light distribution pattern formed by the automotive headlamp apparatus 10 can be switched in accordance with an operation of a light switch 106 by a driver. That is, the headlamp apparatus control units 40L and 40R managed by the pattern control unit 74, control the solenoids 66bL and 66bR in accordance with an operation state of the light switch 106 to change moving states of the movable shades 48L and 48R in the left lamp unit 22L and the right lamp unit 22R, so that the synthesized light distribution pattern as well as each individual light distribution pattern are formed.

The automotive headlamp apparatus 10 according to the present embodiment may be automatically controlled by detecting situations around a vehicle with various sensors, independently of an operation of the light switch 106, so that the synthesized light distribution pattern optimal for the situations around the vehicle is formed. For example, in the case where a preceding vehicle, oncoming vehicle or pedestrian is detected to be present in the front direction of the vehicle, the automotive control unit 102 decides that a glare should be prevented by forming the synthesized light distribution pattern for a low-beam. Then, the pattern control unit 74 controls the headlamp apparatus control unit 40L such that the individual light distribution pattern for a low-beam is formed in which a certain amount of the light from the light source such as the bulb 30L, etc., is shielded by the movable shade 48L in the left lamp unit 22L. Likewise, the pattern control unit 74 controls the headlamp apparatus control unit 40R such that the individual light distribution pattern for a low-beam is formed in which a certain amount of the light from the light source such as the bulb 30R, etc., is shielded by the movable shade 48R in the right lamp unit 22R. As a result, the synthesized light distribution pattern for a low-beam is formed.

In the case where a preceding vehicle, oncoming vehicle or pedestrian is detected to be absent in the front direction of the vehicle, the automotive control unit 102 decides that the visibility of a driver should be enhanced by forming the synthesized light distribution pattern for a high-beam having a widened emitting region. Then, the individual light distribution pattern for a high-beam is formed in which the light from the light source is not shielded by the movable shades 48L and 48R in the left lamp unit 22L and the right lamp unit 22R. In the case where an oncoming vehicle or pedestrian is present but no preceding vehicle in an area of left-hand traffic prescribed by traffic regulations, the automotive control unit 102 forms a left-high light distribution pattern that emits the high-beam only toward the own lane side, the left-high pattern being one of light distribution patterns for the particular high-beam. In the case where only a preceding vehicle is present but no oncoming vehicle or pedestrian, the automotive control unit 102 performs control in order to form a right-high light distribution pattern that emits the high-beam only toward the opposite lane side, the right-high pattern being one of the light distribution patterns for the particular high-beam.

In order to detect an abject such as a preceding vehicle, oncoming vehicle or pedestrian as stated above, a camera 108, for example, a stereo camera, is connected to the automotive control unit 102 in the vehicle 100, as means for recognizing the object. When an image with a feature point indicating a vehicle or pedestrian stored beforehand is present in the image data provided from the camera 108, the automotive control unit 102 provides information to the pattern control unit 74 such that an optimal light distribution pattern is formed in consideration of the vehicle or pedestrian. The means for detecting in the automotive front direction an object for which emission by the automotive headlamp apparatus 10 should be suppressed can be optionally modified. Accordingly, other detecting means such as a millimeter wave radar, infrared radar or the like, may be used instead of the camera 108. Alternatively, those may be combined. The camera 108 may be only for control of the automotive headlamp apparatus 10, or may be used in common with other system. Such a control mode can also be referred to as an image recognition mode.

Also, the automotive control unit 102 can acquire information from a steering sensor 110 or a vehicle speed sensor 112 or the like that are usually installed in the vehicle 100, and may be designed to select a light distribution pattern to be formed in accordance with a moving state or a moving attitude of the vehicle 100. For example, when having decided that the vehicle is rotating based on the information from the steering sensor 110, the automotive control unit 102 enhances the visibility in the rotating direction. That is, the automotive control unit 102 realizes the "swivel function" by driving the actuators 36L and 36R to rotate the left lamp unit 22L and the right lamp unit 22R in the rotating direction such that the center of the light distribution pattern is directed to the rotating direction. Alternatively, the automotive control unit 102 may move the movable shades 48L and 48R in the left lamp unit 22L and the right lamp unit 22R to the advanced positions or the receded positions, so that the left-high light distribution pattern or the right-high light distribution pattern is formed. Such a control mode can be referred to as a rotation sensitive mode.

When driving at a high speed in nighttime, it is preferable that illumination by the headlamps is controlled so as to recognize an oncoming vehicle approaching from a long distance, preceding vehicle, traffic sign or message board as soon as possible. Therefore, when driving at a high speed, the automotive control unit 102 may perform control so as to form a highway-mode light distribution pattern for a low-beam in which part of the shape of the light distribution pattern is modified, based on the information from the vehicle speed sensor 112. This control is realized by moving the light axis upwards within a range of, for example, 0.2° to 0.6° by a not-illustrated level driving mechanism, while the movable shades 48L and 48R in the left lamp unit 22L and the right lamp unit 22R are being fixed to the advanced positions. Visibility for a long distance can be improved by such a control. Such a control mode can be referred to as a speed sensitive mode.

Besides, the automotive control unit 102 can acquire road-shape information, road-mode information, traffic sign installation information or the like from a navigation system 114. By acquiring these information beforehand, the light distribution pattern suitable for a driving road can be smoothly formed. A height of the cut-off line in the light distribution pattern for a low-beam can be adjusted in the up-down direction by a level control unit. For example, when there is an ascending slope forwards, the road appears to extend above the horizontal standard line (H line) in the emitting region, as seen from a driver. In this case, the emitting region is adjusted such that the cut-off line extends along the road surface by raising the line than usual. In contrast, when there is a downhill slope forwards, the cut-off line is lowered than usual. By performing such a control, emission of a light suitable for road undulation becomes possible. Such a control mode can be referred to as a navi-sensitive mode. In addition, a road shape or undulation state may be recognized based on the information from the camera 108.

Also, the automotive control unit 102 can acquire vehicle's current height information from a vehicle height sensor 116. An attitude of a vehicle differs according to occupants or loads, and also changes when accelerated or decelerated. As the attitude of a vehicle changes, a height of the light axis changes accordingly. That is, the synthesized light distribution pattern superimposed by movements of the movable shades 48L and 48R in the left lamp unit 22L and the right lamp unit 22R, changes up and down. Therefore, the automotive control unit 102 acquires vehicle's current attitude information by detecting a suspension's expansion and contraction state of each wheel through the vehicle height sensor 116. The automotive control unit 102 then provides the attitude information to the pattern control unit 74. The pattern control unit 74 integrally controls the headlamp apparatus control units 40L and 40R. That is, the pattern control unit 74 corrects the light axis such that the synthesized light distribution pattern formed by each of the movable shades 48L and 48R in the left lamp unit 22L and the right lamp unit 22R, is emitted toward an optimal position in accordance with a moving state by controlling the not-illustrated level driving mechanism in accordance with the acquired attitude information. By performing such control, light emission of high quality can be provided. Such a control mode can be referred to as a vehicle height sensitive mode.

Figure 6:
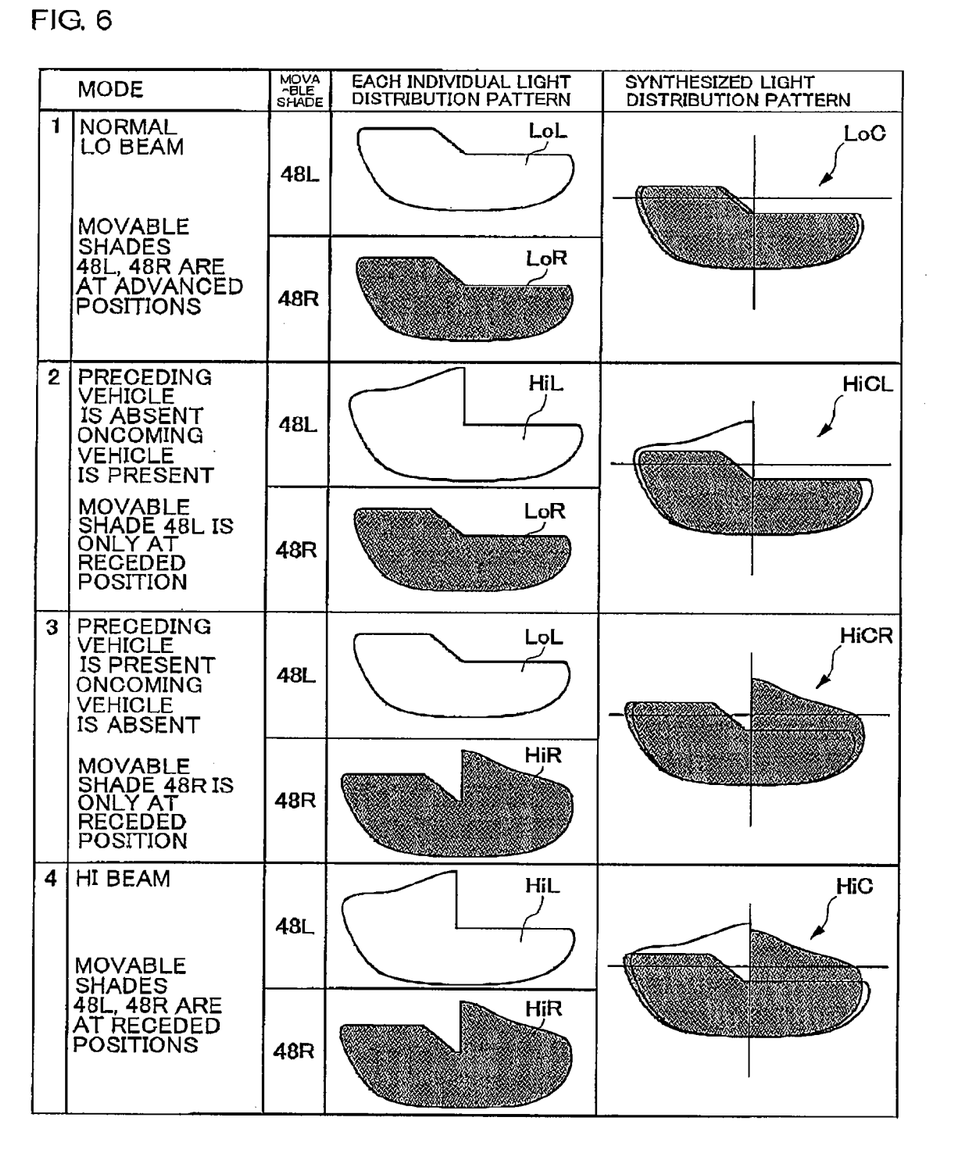
FIG. 6 is an illustrative diagram illustrating individual light distribution patterns formed by the left lamp unit and the right lamp unit and synthesized light distribution patterns formed by superimposing the individual light distribution patterns one on anther, in the automotive headlamp apparatus according to the present embodiment.

Examples of the individual light distribution patterns respectively formed by the left lamp unit 22L and the right lamp unit 22R in the automotive headlamp apparatus 10 structured as stated above, and that of the synthesized light distribution pattern formed by superimposing the individual light distribution patterns one on another, are illustrated in FIG. 6.

"Mode 1" illustrates the light distribution pattern for a "low-beam" normally applicable to an area of left-hand traffic prescribed by traffic regulations. In this case, the movable shades 48L and 48R both move to the advanced positions to form the individual light distribution patterns LoL and LoR having substantially the same shape with each other. Accordingly, the synthesized light distribution pattern for a low-beam LoC formed by superimposing the both patterns one on another has the same shape. In FIG. 6, the synthesized light distribution pattern is intentionally changed in size from that of the light distribution patterns for a low-beam LoL and LoR, in order to illustrate that the both patterns LoL and LoR are superimposed one on another; however, they may have exactly the same size. In this case, because the individual light distribution pattern for a low-beam LoL formed by the left lamp unit 22L and that LoR formed by the right lamp unit 22R are overlapped one on another, the synthesized light distribution pattern for a low-beam LoC has an illuminance made by adding illuminances in the both individual light distribution patterns together. The synthesized light distribution pattern for a low-beam LoC becomes a normal pattern, taking in consideration not to provide a glare to an oncoming vehicle, preceding vehicle or pedestrian when keeping to the left.

"Mode 2" illustrates the light distribution pattern for emitting the high-beam only toward the own line side in left-hand traffic, the light distribution pattern being the so-called "left-high" light distribution pattern, which is classified into the light distribution pattern for a particular high-beam. In this case, the movable shade 48L only moves to the receded position, while the movable shade 48R to the advanced position, allowing the individual light distribution pattern for a low-beam LoR to be formed by the movable shade 48R, and the individual light distribution pattern for a high-beam HiL to be formed by the fixed shade 50L because the movable shade 48L recedes. When superimposing the both one on another, the left-high light distribution pattern HiCL can be synthesized in which the left emitting region in the front direction of the vehicle is in a high-beam emitting state while the right emitting region therein is in a low-beam emitting state. The left-high light distribution pattern HiCL is preferably used when a preceding vehicle or pedestrian is not present in the own lane and an oncoming vehicle or pedestrian is present in the opposite lane. The light distribution pattern HiCL does not provide a glare to the oncoming vehicle or pedestrian on the opposite lane side when keeping to the left, allowing the visibility to be improved by emitting the high-beam only toward the own lane side.

"Mode 3" illustrates the light distribution pattern for emitting the high-beam region only toward the opposite lane side in left-hand traffic, the light distribution patterns being the so-called "right-high" light distribution pattern, which is classified into the light distribution pattern for a particular high-beam. In this case, the movable shade 48R only moves to the receded position, while the movable shade 48L to the advanced position, allowing the individual light distribution pattern for a low-beam LoL to be formed by the movable shade 48L, and the individual light distribution pattern for a high-beam HiR to be formed by the fixed shade 50R because the movable shade 48R recedes. When superimposing the both one on another, the right-high light distribution pattern HiCR can be synthesized in which the right emitting region in the front direction of the vehicle is in a high-beam emitting state while the left emitting region therein is in a low-beam emitting state. The right-high light distribution pattern HiCR is preferably used when a preceding vehicle or pedestrian is present in the own lane and an oncoming vehicle or pedestrian is not present in the opposite lane. The light distribution pattern HiCR does not provide a glare to a preceding vehicle or pedestrian on the own lane side when keeping to the left, allowing the visibility to be improved by emitting the high-beam only toward the opposite lane side.

In each of the left-high light distribution pattern HiCL and the right-high light distribution pattern HiCR, a portion where the respective individual light distribution patterns are overlapped one on another, i.e., a portion corresponding to the light distribution pattern for a low-beam only has an illuminance made by adding illuminances in the both individual patterns together, leading to brightness. An additional portion of the single-high light distribution pattern, which is formed on the portion corresponding to the light distribution pattern for a low-beam, has the same illuminance as that occurring when the left lamp unit 22L or the right lamp unit 22R solely emits the beam.

"Mode 4" illustrates the light distribution pattern for a high-beam. In this case, the movable shades 48L and 48R move to the receded positions. Accordingly, the individual light distribution patterns for a high-beam HiL and HiR are formed by the fixed shades 50L and 50R because the movable shades 48L and 48R recede. When superimposing the both one on another, the light distribution pattern for a high-beam HiC that emits the beam toward a wide range in the front direction of the vehicle is formed. Also in this case, each of additional portions of the left-high light distribution pattern and the right-high light distribution pattern, which is formed on the portion corresponding to the light distribution pattern for a low-beam, has an illuminance as that occurring when each of the left lamp unit 22L and the right lamp unit 22R solely emits the beam.

As described above, the left lamp unit 22L and the right lamp unit 22R can realize the swivel function by subjecting the actuators 36L and 36R to rotational control by the same angle in the same direction. Further, when forming the synthesized light distribution pattern for a high-beam HiC, or when forming the left-high light distribution pattern HiCL and the right-high light distribution pattern HiCR, the actuator 36L in the left lamp unit 22L and the actuator 36R in the right lamp unit 22R can be separately subjected to rotational control in the separating direction. In this case, "split emission" can be realized in which a beam is not emitted only toward a place where a certain vehicle or pedestrian is present. Also, when forming the synthesized light distribution pattern for a high-beam HiC, the actuator 36L in the left lamp unit 22L and the actuator 36R in the right lamp unit 22R can be subjected to rotational control in the approaching direction. In this case, the individual light distribution patterns for a high-beam HiL and HiR can be overlapped one on another in the middle region in the front direction of the vehicle, allowing "lap emission" to be realized in which an illuminance in the overlapped region is enhanced and hence the visibility is improved.

In the case where decrease in illuminance in the left-high additional portion or the right-high additional portion is required to be suppressed when forming the synthesized light distribution pattern for a high-beam HiC, or when forming the left-high light distribution pattern HiCL and the right-high light distribution pattern HiCR, an additional lamp may be used. In this case, an illuminance in each of the individual light distribution patterns may be improved by adding one additional lamp in each of the left lamp unit and the right lamp unit; or an illuminance in the synthesized light distribution pattern formed by superimposing the right and left individual light distribution patterns one on another, may be improved by adding one additional lamp.

When executing usual passing by the automotive headlamp apparatus 10 according to the present embodiment, switching between the individual light distribution pattern for a high-beam and that for a low-beam in the left lamp unit 22L and the right lamp unit 22R, may be performed in synchronization with each other. In the present embodiment, the switching is performed by moving the movable shades 48 to the advanced position and the receded position with the use of the solenoid 66b, which can perform swift switching operations, and hence smooth passing can be realized. Further, the left lamp unit 22L and the right lamp unit 22R can separately perform switching between the individual light distribution pattern for a high-beam and that for a low-beam. For example, if passing is designed to be executed in one of the left lamp unit 22L and the right lamp unit 22R, passing like a "wink" can be readily executed, which provides an effect equivalent to that of the usual passing to an oncoming vehicle or pedestrian while approximately maintaining a constant emitting state in the front direction of the vehicle for a driver.

It is noted that the present invention should not be limited to the aforementioned embodiments, and various variations such as design modifications or the like may be made thereto based on knowledge of a person skilled in the art. The structure illustrated in each drawing is intended to exemplify an example, and the structure can be appropriately modified to a structure having a similar function, which can provide similar effects.

What is claimed is:

1. An automotive headlamp apparatus comprising:
a left lamp unit and a right lamp unit that are installed apart from each other, located right and left in the automotive width direction, each of which is capable of forming an individual light distribution pattern; and
a pattern control unit that controls each shape of the individual light distribution patterns of high and low beams with cut-off lines of a horizontally extending light distribution pattern by controlling the left lamp unit and the right lamp unit, so as to form a synthesized light distribution pattern in which the individual light distribution patterns are superimposed,
wherein the left lamp unit includes:
a first light source that is capable of emitting a light in the automotive front direction through a first projection lens;
a first movable shade that is capable of advancing and receding with respect to the light axis of the first light source, that forms a first cut-off line by shielding part of the light from the first light source at an advanced position, the first cut-off line being to the left of a horizontally extending cut-off line of a light distribution pattern for a low-beam, and the first movable shade forms a portion of a light distribution pattern for a high-beam above the first cut-off line at a receded position;
a first shade moving mechanism that moves the first movable shade to an advanced or a receded position; and
a first fixed shade that forms a second cut-off line to the right of the horizontally extending cut-off line of the light distribution pattern for the low-beam when the first movable shade is at the receded position,
wherein the right lamp unit includes:
a second light source that is capable of emitting a light in the automotive front direction through a second projection lens;
a second movable shade that is capable of advancing and receding with respect to the light axis of the second light source, that forms the second cut-off line by shielding part of the light from the second light source at an advanced position, and wherein the second movable shade forms a portion of a light distribution pattern for a high-beam above the second cut-off line at a receded position;

a second shade moving mechanism that moves the second movable shade to an advanced or a receded position;

and a second fixed shade that forms the first cut-off line when the second movable shade is at the receded position the first movable shade and the second movable shade are provided such that the light distribution pattern for a high-beam is formed when both of the movable shades are at the receded positions and wherein the pattern control unit causes one or both of the first moveable shade and the second movable shade to advance or recede by controlling the first shade moving mechanism and second shade moving mechanism to form one of four synthesized light distribution patterns, and wherein the distribution pattern is determined by the pattern control unit.

2. The automotive headlamp apparatus according to claim 1, wherein shapes of the first movable shade and the first fixed shade in the automotive width direction are curved along a curved shape of the backside focal plane of the first projection lens, and shapes of the second movable shade and the second fixed shade in the automotive width direction are curved along a curved shape of the backside focal plane of the second projection lens.

3. The automotive headlamp apparatus according to claim 1, wherein an edge line portion of the first movable shade, which forms the first cut-off line, is arranged along the backside focal plane of the first projection lens at the advanced position, and an edge line portion of the second movable shade, which forms the second cut-off line, is arranged along the backside focal plane of the second projection lens at the advanced position.

4. The automotive headlamp apparatus according to claim 1, wherein the first shade moving mechanism moves the first movable shade to the advanced position so as to avoid forming the light distribution pattern for a high-beam when the pattern control unit is not controlling the first shade moving mechanism, and the second shade moving mechanism moves the second movable shade to the advanced position so as to avoid forming the light distribution pattern for a high-beam when the pattern control unit is not controlling the second shade moving mechanism.

5. The automotive headlamp apparatus according to claim 1, wherein the left lamp unit and the right lamp unit are capable of being rotated, and wherein the pattern control unit rotates the left lamp unit and the right lamp unit in a rotating direction of a vehicle based on an information from a steering sensor such that the center of the light distribution pattern is directed to the rotating direction.

6. The automotive headlamp apparatus according to claim 1, wherein the pattern control unit synchronizes the advancement or receding of the first movable shade and the advancement or receding of the second movable shade.

* * * * *